E. Ripley.
Tea-Kettle.
No 79860. Patented Jul. 14, 1868.
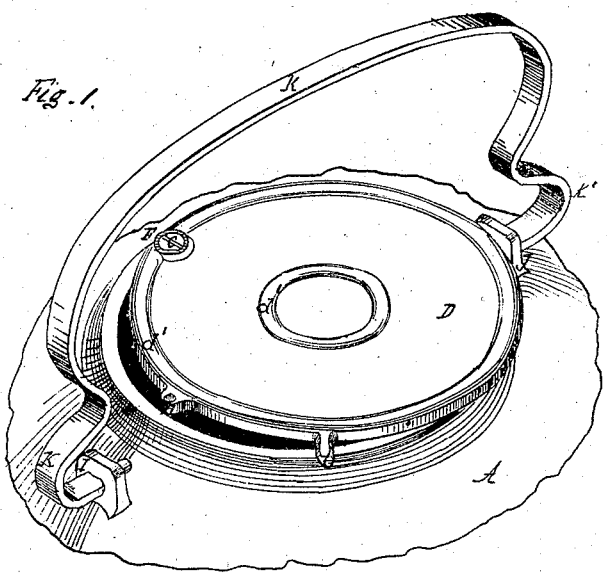
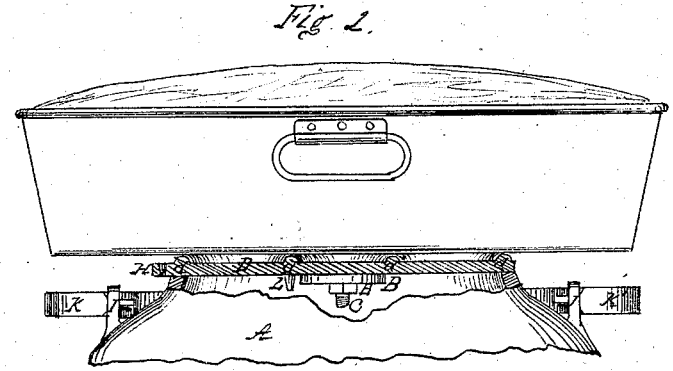
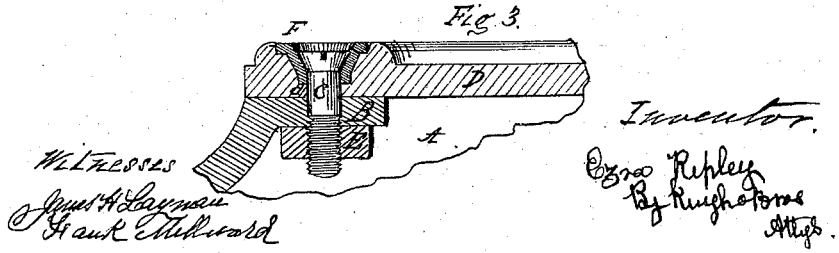

United States Patent Office.

EZRA RIPLEY, OF TROY, NEW YORK, ASSIGNOR TO HIMSELF AND W. C. DAVIS AND COMPANY, OF CINCINNATI OHIO.

*Letters Patent No. 79,860, dated July 14, 1868.*

IMPROVEMENT IN TEA-KETTLES.

*The Schedule referred to in these Letters Patent and making part of the same.*

TO WHOM IT MAY CONCERN:

Be it known that I, EZRA RIPLEY, of Troy, in the county of Rensselaer, and State of New York, have invented a new and useful Lid for Tea-Kettles and other culinary vessels; and I hereby declare the following to be a full, clear, and exact description thereof, reference being had to the accompanying drawings, making part of this specification.

My invention consists in forming the lid or cover of hinged-bail tea-kettles with a flat or level top, so as to enable it to serve the purpose of a shelf on which to set a plate of cakes, a coffee-pot, or other article which it may be desired to keep warm, and for which the top of the stove itself may afford insufficient room or too intense a heat.

Figure 1 is a perspective view of the upper part of a kettle provided with my improved lid.

Figure 2 is a vertical section of the lid and adjacent parts of the kettle.

Figure 3 is an axial section of the pivot-joint.

A represents the upper part of a kettle-body. B is a lug, projecting horizontally over the mouth or opening of the kettle a sufficient distance to receive a pivot-bolt, c, which, passing down through an opening, d, in the lid or cover D, enters a nut, E, below the lug, and, while permitting the lid to swing freely around it in a horizontal plane, yet serves to confine the lid to its place on the body aforesaid. A bush or washer, F, may be interposed between the pivot C and the lid.

Instead of the usual crowning form, my lid is flat or horizontal on its top surface, as shown, or, if ornamented or stiffened by beads, $d'$, or otherwise, then the general level of said beads or ornaments is such as to permit any vessel, like a pan or plate, to rest securely upon it, (see fig. 2.)

Projecting horizontally from the lid may be an ear, G, to facilitate its opening or closure, and an eye, H, to enable the lid to be wired fast to the bail-ear for shipping.

The bail-ears I J are so disposed upon the kettle-body, and of such height, as for their tops to be at somewhat less elevation than the rim of the kettle, in order that the lid may be enabled to swing clear of the said ears and of the depressed bail; and that part of the bail K which, when said bail is elevated, is in the plane of the lid, may be bowed outward, as at $k\ k'$, sufficiently to allow the lid to swing clear.

A teat or stud, L, depending from the under side of the lid, may serve as a stop in swinging open.

I have selected for illustration the preferred form of my invention, but reserve the right to vary the same, so long as the essential characteristics are retained, namely, a lid of such flat or level upper surface as to enable its use as a shelf or platform, in addition to its proper or common functions as a cover. For example, the cover may be hinged so as to open in a vertical instead of a horizontal plane, or may be loose or attached to the tea-kettle by other mechanical devices.

I claim herein as new, and of my invention—

1. A tea-kettle, or other culinary vessel, having a hinged bail and an edgewise-swinging cover, so hinged or pivoted, and made flat, or so shaped on top, that the cover forms a convenient shelf for supporting and warming other culinary vessels of larger diameter than the cover.

2. In combination with a cover formed and hinged as specified in the preceding clause, I further claim so constructing and applying the bail or lifting-handle and the rear bail-lug, that when the bail is turned down, it will permit the cover to swing over it, as described.

3. I further claim, in connection with a flat-topped swinging cover, the lug or handle G, projecting horizontally, in such a manner as to offer no obstruction to placing a vessel upon said cover.

In testimony of which invention, I hereunto set my hand.

EZRA RIPLEY.

Witnesses:
GEO. H. KNIGHT,
AUSTIN F. PARK.